W. BROAD.
DRY CELL BATTERY.
APPLICATION FILED SEPT. 17, 1912.
1,086,437.
Patented Feb. 10, 1914.
2 SHEETS—SHEET 1.
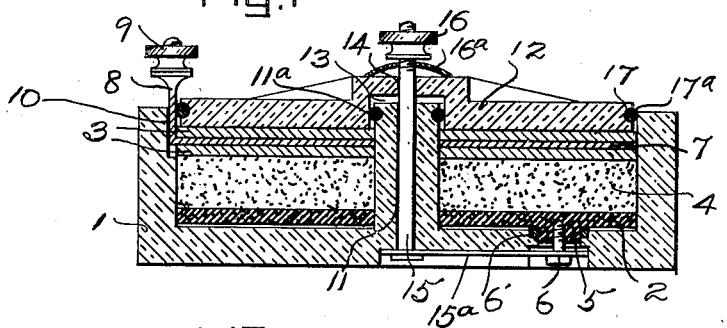
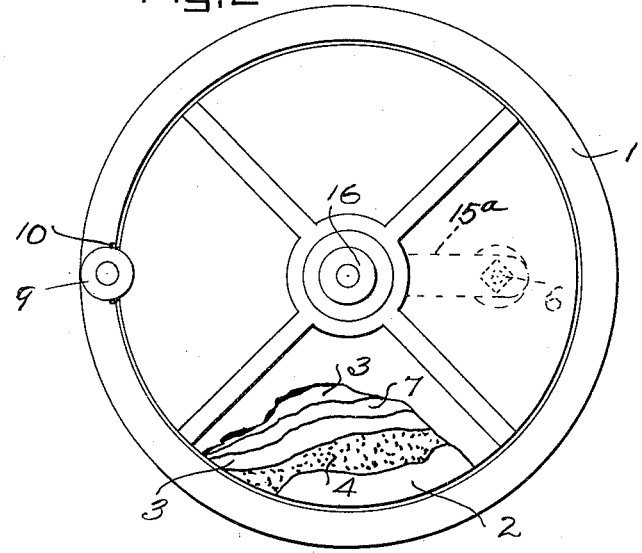
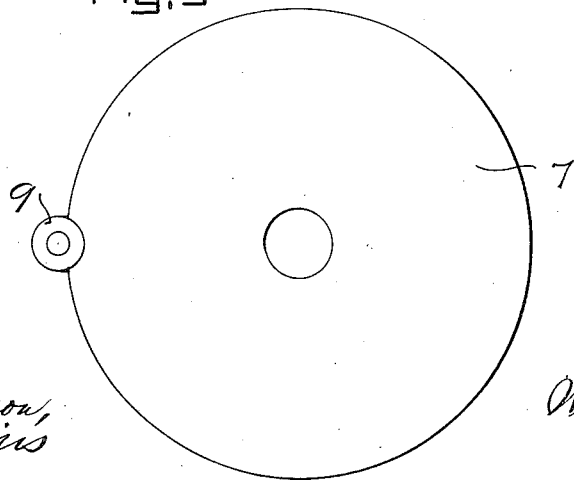
WITNESSES
INVENTOR
William Broad
By H.W. Stevenson
Attorney

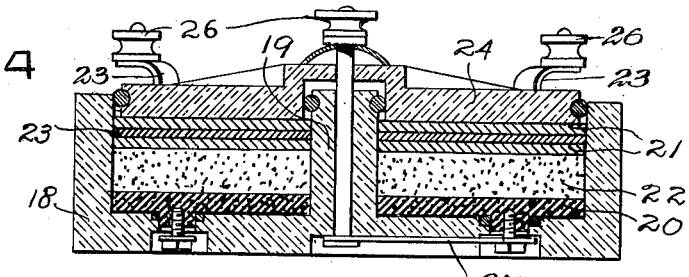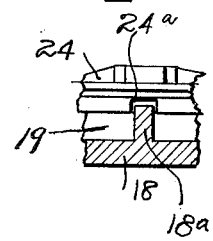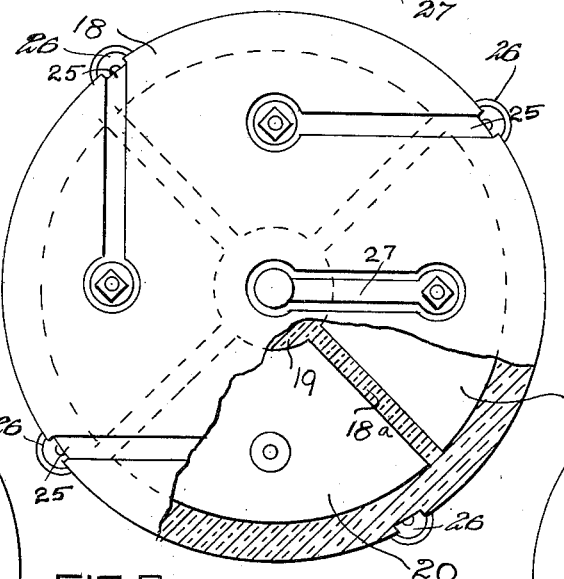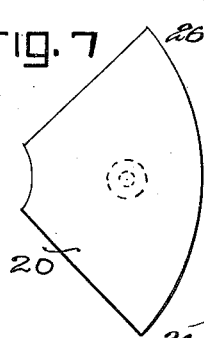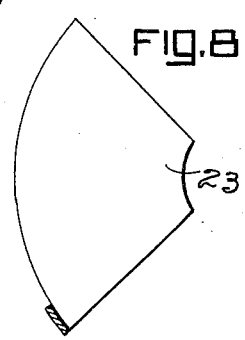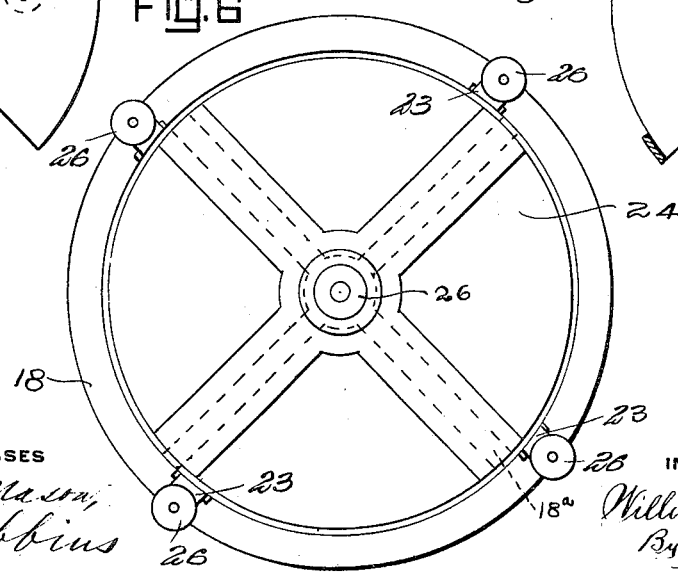

UNITED STATES PATENT OFFICE.

WILLIAM BROAD, OF BEAVER FALLS, PENNSYLVANIA.

DRY-CELL BATTERY.

1,086,437.  Specification of Letters Patent.  Patented Feb. 10, 1914.

Application filed September 17, 1912. Serial No. 720,824.

*To all whom it may concern:*

Be it known that I, WILLIAM BROAD, a citizen of the United States, residing at Beaver Falls, in the county of Beaver and State of Pennsylvania, have invented a certain new and useful Improvement in Dry-Cell Batteries, of which the following is a specification.

My invention pertains to new and useful improvements in liquid tight, or what is commonly known to the trade as "dry" cell batteries, for well known and universally used purposes, principally for open circuit work of any nature, also flash lights, gas ignition, etc., the basic idea being to so construct a battery of this class and variety wherein the requisite elements necessary to set up an electric current, and referring principally to the electro-positive or zinc element, depolarizing mass and excitant electrolyte may be renewed from time to time at a minimum of cost.

The so-called "dry" cell batteries at present known and in use are not renewable, i. e., the necessary elements composing the same are non-separable, they being so constructed that when the chemically generated electricity is exhausted the battery then becomes "dead," and of no further use whatever, being thrown away to be replaced by an entirely new one.

My invention provides a simple and practical liquid tight or so called "dry" battery constructed on an entirely new and original principle, whereby the well known electropositive or zinc element, depolarizer and electrolyte, which constitute the fundamental component parts of all "dry" batteries, are so placed and arranged that they can be easily and quickly removed from the remaining elements, when their chemical life is exhausted, to be as readily replaced by new and fresh members, thereby renewing the life of the battery each time this process is repeated.

I have likewise discovered what I claim as an entirely new and original principle in the construction of "dry" cell batteries whereby the voltage efficiency or electric current can be greatly increased or "boosted" by simply holding said electro-positive or zinc element under compression of a more or less degree and in close engagement with its contacting electrolyte.

Another important feature of my invention resides in the means I employ for utilizing both sides of the zinc element, either simultaneously, or alternately by a reversing method, whereas only one side is taken advantage of in the present known forms, thereby practically doubling the life and efficiency of this said element.

I do not specify or limit myself to any particular electrolyte, or composition of elements necessary to form an electrolyte, as my invention relates primarily to the constructive features whereby the battery elements are made removable, and when operatively combined with the remaining elements are held under compression.

Constructively my improved "dry" battery involves a retainer or shell of non-conducting material, that may be formed out of any suitable substance, such as porcelain, glass, or any other insulating material, and which houses the requisite elements for generating electric energy or current, including the renewable zinc member, depolarizer and electrolyte. This retainer is preferably made approximately in the form shown, either as a single cell, or an assembled plurality of cells, any adequate configuration being possible.

I am also able to conserve the size of the cell and retainer, and produce a battery of high voltage, and having a large output of current, in a comparatively small space, which feature will be of great advantage to the trade both in economy of space and reduction of weight.

A still further important feature of my invention lies in the fact that the well known, and highly objectionable, deterioration or "shelf waste," of all now known batteries of the so called "dry" class, is overcome and absolutely guarded against in the construction herein set forth. The electropositive or zinc element, together with the depolarizer and absorbent material containing the electrolyte, can be kept separate from the other requisite elements, and only united therewith when the battery is to be put into service; sufficient moisture being added to insure proper working.

In the accompanying drawings, forming a part of this specification, I have illustrated one embodiment of my invention, involving a simple and preferred form of single cell, and also a retainer involving an assembled plurality of the same.

Referring then to said drawings Figure 1 is a transverse section of a single cell type. Fig. 2 shows a plan view of the same partially broken away. Fig. 3 is a plan of the removable zinc member. Fig. 4 shows a transverse section of a multiple cell battery. Fig. 5 is an inverted plan of the form shown in Fig. 4, partially broken away and showing connectors. Fig. 6 is a plan view of the form shown in Fig. 4. Fig. 7 is the cathode or carbon plate used in the multiple cell. Fig. 8 is the anode or zinc plate used in this form, and Fig. 9 is a fragmental view of the multiple cell, partly in section, illustrating means for positioning the removable cover over the partitioning walls.

Throughout the drawings the cell or retainer, which, as heretofore mentioned, can be constructed in any adequate size or configuration, and made from any suitable insulating material, is designated as a whole by the numeral 1, the form shown in Fig. 1 being of the single cell type, in which is adequately and conveniently arranged the requisite elements for generating electrochemical energy or voltage, involving the well known carbon constituent 2, electrolyte container 3, in the preferred form of an absorbent or moisture retaining member, usually of blotting paper, or any other adequate material, and depolarizing agent 4, which said elements are arranged in the cell approximately as shown.

The carbon element is illustrated as being in the form of a disk, conforming to the configuration of the cell, and is provided with a depending or protruding boss member 5, which serves as a contact point to affix a suitable metallic terminal 6, constituting the positive pole of the battery. The necessary aperture in the bottom of the retainer, through which said boss protrudes, is sealed by a suitable gasket 6' on the inside of the cell, which will guard against corrosion of said terminal by preventing leakage of the chemicals.

Loosely and removably positioned interior of the cell, on top of the electrolyte containing element 3, is the essential electro-positive or zinc member 7, which is likewise of a disk formation conforming to the configuration of the cell, and occupies practically the entire surface area above the said electrolyte. This said electro-positive or zinc member is provided with an extension or lug portion 8, preferably integral therewith, which, in the arrangement shown, is adapted to project upward and out of the cell, and carries a fixed terminal 9, or negative pole of the battery, said projection entering and seating in a suitable notch or recess 10 formed in the inner wall of the cell.

The retainer 1 is provided with a centrally positioned and upwardly projecting hollow or apertured column or riser portion 11, the upper plane of which is on an approximate level with the top of the cell; the respective heretofore designated elements to be housed by the retainer being centrally apertured to seat over this said column.

A cap, or pressure block member 12, preferably made of the same insulating material as the body of the retainer, is utilized and adapted to enter the cell and seat on top of the removable electro-positive or zinc member 7, said cap involving a central recess 13 to receive and seat over the said column 11, also with a reduced aperture 14, communicating with said recess, adapted to register with the opening formed in said column, whereby a threaded bolt 15 may be inserted therethrough, and a compression or squeezing process be set up by means of a jam nut 16, which engages against a spring actuated washer or disk 16$^a$, seated around the bolt 15 and between the jam nut and top of the cap, serving as an automatic means for keeping up continuous compression interior of the cell. This central bolt 15 is preferably in contact with the positive pole of the battery, by means of a suitable metallic contacting clip or wire 15$^a$, as shown, thus locating the positive terminal at the top of said bolt and at the usual convenient position.

A suitable groove is provided in the column 11, near its upper extremity, in order to receive a rubber sealing ring or gasket 11$^a$ in order to overcome leakage at this point and provide an adequate sealing feature. Said apertured column acts as an insulating wall to protect the compression bolt 15 from chemical action and prevents corrosion thereof.

It being essential to retain the moisture or electrolyte held by the absorbent element, and prevent evaporation of the same, I have provided a circumferential groove 17 in the said pressure cap member, adapted to receive a gasket 17$^a$, or similar means, for setting up an adequate sealing feature when the two members 1 and 12 are brought into engagement with one another. Any other suitable sealing means can be substituted for that just described, this being simply a detail of the construction and a matter for further development.

In Fig. 4 I have shown a multiple battery involving a plurality of individual cells combined in one retainer 18, which feature will be of great advantage in handling and economy of space. This form involves practically the same constructive features of the single cell, with the exception that this combination receptacle is divided by walls 18$^a$ into as many separate compartments as desired, four being shown herewith, the said walls radiating from the centrally positioned and apertured hub or column 19. Each cell thus formed will be supplied with the requisite elements to set up electrochemical action or voltage, the materials here shown involving a carbon plate 20, suitable electrolyte container 21, depolarizing agent 22, and electro-positive or zinc element 23, which said elements will all be formed to suit the segmental configuration of the cells, and all will be removably seated therein; the said zinc member being uppermost for convenience of renewal.

In order to set up the desired compression in this form of multiple cells I provide a suitable cap or pressure block 24, on its lower or contacting face being the required number of separated pressure segments or feet 24ª, which enter the respective cells, and insure the desired equalized compression, when said cap is applied. This form also involves the same sealing features as the single cell, heretofore described, and likewise the central bolt, nut, and washer elements, also all necessary terminals. In this form of multiple cells the usual and well known connections 25 are made between the respective cells, and suitable terminals 26 provided, whereby the voltage of a single cell can be utilized, or the combined voltage of any two or all the cells can be drawn on simultaneously, the central bolt acting in all cases as the positive pole of the battery, a strip 27 being utilized to connect said central bolt with the carbon of one of the cells.

The fundamental features of my invention, on which I lay great stress, consist in its adaptability and convenience for being refilled or renewed at a minimum of cost, its being portable, its positive sealing features, and also the use of compression to increase the output of voltage or current.

The electro-positive element will, on account of its recognized nature and adaptation, possibly be the first to deteriorate, so that when the battery is finally "run-down" or exhausted of its electrical energy, all that is required with my invention is to release and remove the pressure cap, take out the old and burnt-out zinc member, insert a fresh electro-positive element, adding sufficient new electrolyte or moisture or depolarizer if necessary, and reapply the said pressure block, when my battery will be revived, and as good as new.

In my preferred form of liquid tight or "dry" battery the zinc anode is covered on both sides thereof with an absorbent material retaining the electrolyte, and the diameter of said zinc member is somewhat less than the inside diameter of the cell. By this construction I am enabled to utilize the entire surface area of both sides of this said zinc member simultaneously, and when the required compression is applied, in the manner heretofore described, to this said zinc member, the electrolyte will, on account of the intended leakage around practically the entire edge of said zinc, saturate the absorbent material on the upper as well as the lower side thereof.

The mechanical and automatic compression set up in my improved battery insures a maximum voltage throughout the life of the anode or zinc element, for the reason that each cell, when under compression, keeps whatever moisture is contained in the battery in constant and active touch with the electro-positive or zinc member. This important feature overcomes to a large extent the dry corrosion and deadening condition found in all present forms of so called "dry" batteries, and insures the rated output of voltage as long as there is any electrolyte moisture remaining in the cell, or until the life of the said zinc element is entirely exhausted.

It is possible to "rest" my improved liquid tight dry cell battery, and temporarily withdraw the electro-positive element or anode from the full chemical action of the exciting electrolyte, by simply loosening up on the compression applied to the cap member.

In Fig. 9 I have shown a sectional view of the sealing means provided between the removable cap 24 and central column 19 of the multiple retainer, illustrating the relative positions of the said cap with respect to the walls 18ª dividing the retainer into cells, which sealing means prevents leakage of the electrolyte to the central compression bolt.

It is my intention to utilize approximately the elements now well known in the art, for setting up chemically generated electricity in my improved dry cell battery, including zinc and carbon elements, the electrolyte being composed of chlorid of zinc and sal ammoniac suitably proportioned, and the depolarizer a mixture of manganese dioxid and carbon or graphite, or both, together with sufficient water to give proper amount of moisture.

I do not limit myself to the foregoing designated filling mixture, as further development may determine a more satisfactory substitute for that given, the scope of my invention being confined to the construction of the cell, with special emphasis on the convenient renewable features of its contents, and mechanically adjustable compression to minimize resistance within the cell, and insure the maximum output of voltage and amperage.

In referring to the term "pressure member" in the claims, reference is made to the cover portion of the receptacle designated by the numeral 12, which may be of any desired configuration and serves as a means for transmitting pressure to the battery element, it having sufficient rigidity, its shape and size being immaterial.

The externally adjustable function set forth in claim 10 means that this feature can be taken care of from the outside without the necessity for dismantling the cell.

By the term receptacle, as repeatedly used throughout the specifications and claims, I mean to imply the cell that directly contains the removable battery elements, and not an external receptacle or casing housing a cell.

What I claim as my invention is:

1. A refillable dry cell battery including a receptacle, a movable pressure member therefor, a battery element within said receptacle comprising complementary electrodes and a suitable filling there-between, resilient means for forcing said pressure member against the battery element whereby the electrodes and filling are held together under compression, and means for adjusting this compression to keep it substantially uniform.

2. A refillable dry cell including a receptacle, a removable and adjustable pressure member to enter said receptacle, a battery element removably held within said receptacle comprising anode and cathode members together with an intermediate depolarizing mass and excitant electrolyte, and adjustable compression means for forcing said pressure member against the battery element.

3. A refillable dry cell including a receptacle, a removable and adjustable pressure member to enter said receptacle, a battery element within said receptacle comprising anode and cathode members together with an intermediate depolarizing mass and excitant electrolyte, said anode being uppermost, and adjustable means for forcing the pressure member against said anode in order to set up compression in the battery element.

4. A refillable dry cell including an insulated receptacle, a movable cover therefor also of insulating material to enter said receptacle, a battery element removably held within said receptacle comprising anode and cathode members together with an intermediate depolarizing mass and excitant electrolyte, said anode being uppermost, means for exposing all surfaces of said anode simultaneously to the action of the excitant electrolyte, and adjustable means for forcing the cover against said anode thereby setting up compression in the battery element.

5. A refillable dry cell battery including a receptacle of insulating material in which is removably housed the necessary elements for setting up chemically generated electricity, including a zinc anode, carbon cathode, together with an intermediate depolarizing mass and excitant electrolyte, a removable and adjustable cover of insulating material, involving a moisture sealing means, and adjustable compression means for forcing said cover against said zinc anode.

6. A refillable dry cell battery including a receptacle of insulating material divided into a plurality of walled-in cells in which are removably housed the necessary elements for producing chemically generated electricity, including zinc anodes, carbon cathodes, depolarizing mass and excitant electrolyte, a removable cover of insulating material, involving moisture sealing means, and adjustable compression means for holding said cover in contact with said zinc elements.

7. A refillable dry cell including a receptacle, a movable cover therefor, a renewable battery element within said receptacle comprising complementary electrodes and a suitable filling there-between, adjustable means for forcing said cover against the battery element whereby the electrodes and filling are held together under compression, and resilient means for keeping this compression substantially uniform.

8. A new article of manufacture involving a hollow retainer of insulating material, having a centrally positioned and apertured column or riser, and a detachable apertured cap member of the same material adapted to enter the said retainer and seat over the said central column.

9. A new article of manufacture involving a hollow retainer of insulating material having a centrally positioned and apertured column or riser, divided by radial walls into a plurality of separated cells, and a detachable apertured cap member of the same material supplied with under disposed and separated feet or lugs corresponding to the configuration of said cells adapted to enter the said retainer and seat over said central column.

10. In a refillable dry cell battery, a receptacle, a battery element disposed therein and readily removable therefrom, said battery element comprising anode and cathode members with an intermediate depolarizing mass and excitant electrolyte, and externally adjustable compression means acting as a part of the cell structure on said element.

In testimony whereof, I affix my signature in the presence of two witnesses.

WILLIAM BROAD.

Witnesses:
  M. S. THOMPSON,
  H. W. STEVENSON.